US009480016B2

(12) United States Patent
Piipponen et al.

(10) Patent No.: US 9,480,016 B2
(45) Date of Patent: Oct. 25, 2016

(54) APPARATUS AND METHOD FOR SUPPORT OF ADDITIONAL MAXIMUM POWER REDUCTION BY USER EQUIPMENT

(71) Applicant: Nokia Technologies Oy, Espoo (FI)

(72) Inventors: Antti Piipponen, Vantaa (FI); Petri Vasenkari, Turku (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 14/419,168

(22) PCT Filed: Jul. 29, 2013

(86) PCT No.: PCT/FI2013/050776
§ 371 (c)(1),
(2) Date: Feb. 2, 2015

(87) PCT Pub. No.: WO2014/023875
PCT Pub. Date: Feb. 13, 2014

(65) Prior Publication Data
US 2015/0208346 A1  Jul. 23, 2015

Related U.S. Application Data

(60) Provisional application No. 61/679,930, filed on Aug. 6, 2012.

(51) Int. Cl.
*H04B 7/00* (2006.01)
*H04W 52/02* (2009.01)
(Continued)

(52) U.S. Cl.
CPC ......... *H04W 52/0209* (2013.01); *H04W 52/36* (2013.01); *H04W 52/146* (2013.01); *H04W 52/243* (2013.01); *H04W 52/365* (2013.01); *H04W 52/367* (2013.01); *Y02B 60/50* (2013.01)

(58) Field of Classification Search
USPC .............. 455/522, 68–70; 370/310, 315–320
See application file for complete search history.

(56) References Cited

U.S. PATENT DOCUMENTS

2014/0307681 A1* 10/2014 Feuersaenger ........ H04L 5/0007
370/329
2015/0031410 A1*  1/2015 Lim .................... H04W 52/146
455/522
2015/0195797 A1*  7/2015 Haim .................. H04W 52/365
455/522

FOREIGN PATENT DOCUMENTS

EP           2 426 824 A1    3/2012
WO          2012023759       2/2012
(Continued)

OTHER PUBLICATIONS

3GPP TR 37.804 V11.0.0 (Jun. 2012), 3rd Generation Partnership Project; Technical Specification Group Radio Access Network; Study on UMTS/LTE in 900 MHz band and coexistence with 850 MHz band (Release 11), pp. 1-34.*
(Continued)

*Primary Examiner* — Fayyaz Alam
(74) *Attorney, Agent, or Firm* — Squire Patton Boggs (US) LLP

(57) ABSTRACT

According to an example embodiment of this application, a method may include by a processor, receiving an indication of the version of an additional maximum power reduction table supported by a user equipment (401). According to an example embodiment of this application, a method may include by a processor, allocating different resources to a user equipment, receiving power headroom reports generated by the user equipment based on the allocated resources, and determining based on the received power headroom reports whether the user equipment supports an additional maximum power reduction table.

18 Claims, 5 Drawing Sheets

(51) Int. Cl.
*H04W 52/36* (2009.01)
*H04W 52/14* (2009.01)
*H04W 52/24* (2009.01)

(56) References Cited

FOREIGN PATENT DOCUMENTS

WO 2012091651 7/2012
WO 2012173057 12/2012

OTHER PUBLICATIONS

ETSI TS 136 101 V8.7.0 (Oct. 2009), LTE; Evolved Universal Terrestrial Radio Access (E-UTRA); User Equipment (UE) radio transmission and reception (3GPP TS 36.101 version 8.7.0 Release 8), pp. 1-158.*

International Search Report and Written Opinion received for corresponding Patent Cooperation Treaty Application No. PCT/FI2013/050776, dated Nov. 5, 2013, 15 pages.
UE's Behaviour for unknown Network Signalling. 3GPP Draft; R4-092932; KDDI; 3GPP TSG-RAN WG4 Meeting #52, Shenzhen China. Aug. 24-28, 2009; pp. 1-3.
Enhancement of additional emission requirement handling. 3GPP Draft; R4-120385; Samsung; 3GPP TSG-RAN WG4 RAN4 #62, Dresden, Germany, Feb. 6-10, 2012.
Band 13 operation and NS07. 3GPP Draft; R4-124501; Nokia Corporation; 3GPP TSG-RAN WG4 Meeting 364, Qingdao P.R. China, Aug. 13-17, 2012, pp. 1-7.
Introducing revisions of MPR/A-MPR specifications. 3GPP Draft; R4-132892; Nokia Corporation; TSG-RAN Working Group 4 (radio) Meeting #67, Fukuka, Japan, May 20-24, 2013 pp. 1-6.
Canadian Office Action dated Mar. 4, 2016 corresponding to Canadian Patent Application No. 2,880,503.
Supplementary European Search Report dated Feb. 19, 2016 corresponding to European Patent Application No. 13827852.8.

* cited by examiner

Table 6.2.4-2: A-MPR for "NS_07"

| | Region A | | Region B | | Region C |
|---|---|---|---|---|---|
| RB_start[1] | 0 – 12 | 6 – 8 | 13 – 18 | 19 – 42 | 43 – 49 |
| L_CRB[2] [RBs] | 1 to 5 and 9-50 | | ≥8 | ≥18 | ≥12 |
| A-MPR [dB] | ≤12 | ≤8 | ≤12 | ≤6 | ≤3 |

Note
1  RB_start indicates the lowest RB index of transmitted resource blocks
2  L_CRB is the length of a contiguous resource block allocation
3  For intra-subframe frequency hopping between two regions, notes 1 and 2 apply on a per slot basis.
4  For intra-subframe frequency hopping between two regions, the larger A-MPR value of the two regions may be applied for both slots in the subframe.

Figure 2

APPARATUS AND METHOD FOR SUPPORT OF ADDITIONAL MAXIMUM POWER REDUCTION BY USER EQUIPMENT

RELATED APPLICATIONS

This application was originally filed as PCT Application No. PCT/FI2013/050776 filed Jul. 29, 2013, which claims priority benefit from U.S. Provisional Application No. 61/679,930 filed Aug. 6, 2012.

TECHNICAL FIELD

The present invention relates generally to an apparatus and a method for support of additional maximum power reduction by user equipment.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application.

In wireless communication, different collections of communication protocols are available to provide different types of services and capabilities. The long term evolution (LTE) is one of such collection of wireless communication protocols that extends and improves the performance of existing UMTS (universal mobile telecommunications system) protocols and is specified by different releases of the standard by the 3$^{rd}$ generation partnership project (3GPP) in the area of mobile network technology.

Of interest herein are the further releases of 3GPP LTE targeted towards future international mobile telephony-advanced (IMT-A) systems, referred to herein for convenience simply as LTE-Advanced (LTE-A). A goal of LTE-A is to provide significantly enhanced services by means of higher data rates and lower latency with reduced cost. LTE-A is directed toward extending and optimizing the cureent 3GPP LTE radio access technologies to provide higher data rates at very low cost. LTE-A will be a more optimized radio system fulfilling the international telecommunication union radiocommucation sector (ITU-R) requirements for IMT-A while maintaining backward compatibility with the current LTE release.

One specification of interest is 3GPP TS 36.101 V11.1.0 (2012-06) Technical Specification 3rd Generation Partnership Project; Technical Specification Group Radio Access Network; Evolved Universal Terrestrial Radio Access (E-UTRA); User Equipment (UE) radio transmission and reception (Release 10), which is incorporated by reference herein in its entirety and referred to for simplicity hereafter as 36.101.

SUMMARY

Various aspects of examples of the invention are set out in the claims.

According to a first aspect of the present invention, a method may include by a processor, receiving an indication of the version of an additional maximum power reduction table supported by a user equipment.

According to a second aspect of the present invention, a method may include by a processor, allocating different resources to a user equipment, receiving power headroom reports generated by the user equipment based on the allocated resources, and determining based on the received power headroom reports whether the user equipment supports an additional maximum power reduction table.

According to a third aspect of the present invention, a method may include by a processor, providing to a network element an indication of the version of an additional maximum power reduction table supported by a user equipment.

According to a fourth aspect of the present invention, a method may include by a processor, receiving different resources from a network element, generating power headroom reports based on the allocated resources, and transmitting the power headroom reports to the network element.

BRIEF DESCRIPTION OF THE DRAWINGS

For a more complete understanding of example embodiments of the present invention, reference is now made to the following descriptions taken in connection with the accompanying drawings in which:

FIG. 2 reproduces Table 6.2.4-2: A-MPR for NS_07 from 3$^{rd}$ generation partnership project (3GPP) TS 36.101;

DETAILED DESCRIPTION

Figure 1:
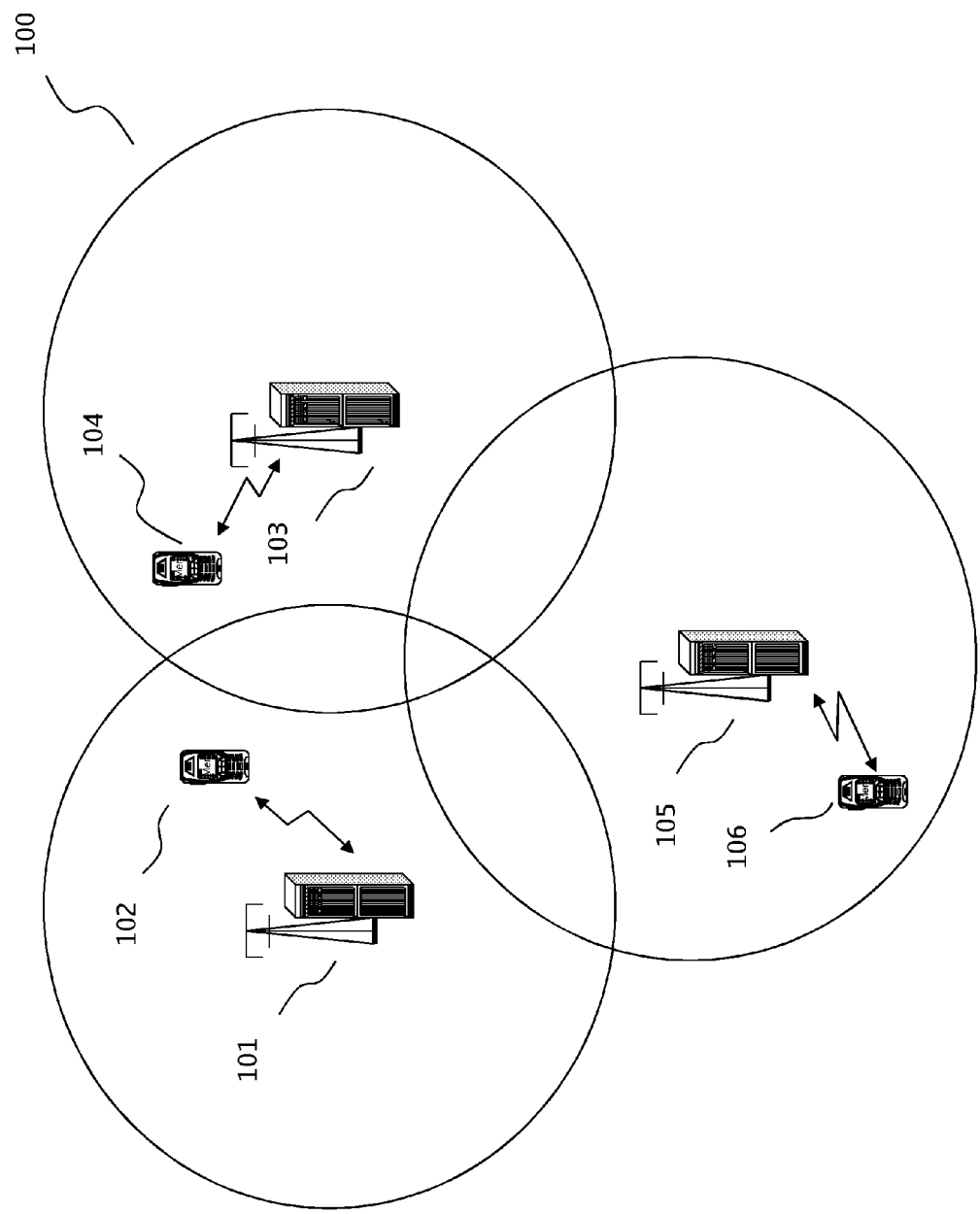
FIG. 1 illustrates an example wireless system in accordance with an example embodiment of the invention.

FIG. 1 illustrates an example wireless system 100 in accordance with an example embodiment of the application. The example wireless system 100 comprises three 3$^{rd}$ generation partnership project (3GPP) evolved Node Bs (eNBs) 101, 103 and 105, each communicating with a user equipment (UE) 102, 104 and 106, respectively. Although three eNBs and just one UE for each eNB are shown in FIG. 1, the example wireless system 100 may comprise more or less eNBs and more UEs for each eNB.

The long term evolution (LTE) uplink (UL) maximum transmit power for power class 3 (regular mobile devices) is +23 dBm. Because the UL signal characteristics can vary widely based on for example, channel bandwidth, amount of allocated resource blocks (RBs), RB positioning within the channel, modulation, etc., the UE may be allowed a maximum power reduction (MPR) to meet spectral emission mask (SEM) and adjacent channel leakage ratio (ACLR) requirements. The rules for MPR are simple: wide RB allocations (relative to channel bandwidth) are allowed MPR because they are more demanding than narrow RB allocations from an unwanted emissions point of view. Also, high order modulations are more demanding for the power amplifiers (PAs) and are allowed more MPR than lower order modulations.

The UE may use the allowed MPR to meet the general SEM and ACLR requirements. However, in some regions of the world some LTE frequency allocations are close to, e.g., public safety (PS) or legacy cellular bands. With the general emission masks the unwanted emissions falling in these existing bands can be too high to guarantee coexistence. To allow flexible use of emission masks, 3GPP TS 36.101 specifies that an LTE eNB can signal a network signaling (NS) value, which indicates to the UEs of the cell that more strict emission limits are in place. The NS values are associated with an additional MPR (A-MPR) table, which the UE may need to consider when transmitting in UL. The limits corresponding to the NS values are specified in 3GPP TS 36.101, as well as the additional MPR (A-MPR) that is allowed to meet the mask requirements.

LTE Band 13 has been introduced in 3GPP specifications in release (Rel) 8 time frame. The band is today used by, for example, Verizon in the United States (US). There are existing PS system deployments in the frequencies adjacent to Band 13 uplink (777-787 MHz; the PS band extends up to 775 MHz with only 2 MHz guard band). The PS band is to be protected with a relatively strict emission mask. To accommodate the wide 10 MHz uplink carrier, 3GPP core specifications define A-MPR for the UE. When a corresponding NS value is signaled by the network, for example, NS_07 in TS 36.101, upon decoding the NS value, the UE considers the corresponding A-MPR table, and is allowed to use reduced maximum output power to keep the unwanted emissions below the specified mask.

Reference can be made to FIG. 2, which reproduces Table 6.2.4-2: A-MPR for NS_07 from 3GPP TS 36.101. The frequency domain resource block positions are divided into three regions by the start index. Region A corresponds to the closest RBs to the protected band, and may be allowed the highest A-MPR. Some RB allocations are allowed no A-MPR, especially when the position is towards the other edge of the channel.

The existing 3GPP specifications allow 5 and 10 MHz carriers to be used on Band 13, but for 5 MHz no A-MPR is allowed. Without A-MPR, a UE transmitting with 5 MHz carrier bandwidth would violate the emission mask for PS protection. Consequently 5 MHz is not used, for example, in Verizon's band in the US. Recently Band 13 has been considered to be deployed in Canada, where the same band plan is followed in the upper 700 MHz region. The Canadian operators could deploy 5 MHz, and a corresponding A-MPR table for 5 MHz bandwidth will be specified in the release 10/11 time frame. The UEs of Rel 10/11 could incorporate the new A-MPR table.

However, the existing Band 13 UEs, referred as legacy UEs, may roam into the new networks, which use 5 MHz channel bandwidth. These UEs would not recognize the new A-MPR table, and therefore would not use A-MPR. They would violate the regulations by exceeding the emission masks, possibly causing harmful interference to the existing Public Safety systems.

In an example embodiment, when a legacy UE roams to a network with a later release that uses a new NS value and a new A-MPR definition, the legacy UE may indicate its Release capability to the network, which shows no support for the new NS value and the new A-MPR. In order to satisfy the additional coexistence emission mask requirements, the eNB scheduler may allocate such resources, which do not get any A-MPR. The scheduling flexibility and UE throughput may be reduced, but spectrum emission violations will not happen.

In another example embodiment, a legacy UE may be able to understand the new A-MPR table, if its firmware can and has been updated. The eNB may be able to probe the UE with different resource allocations and request a power headroom report to determine whether the UE knows the new A-MPR definition. In an example embodiment, for LTE Rel 10, the power headroom report includes a configured maximum power Pcmax and from Pcmax it is possible to conclude if A-MPR was used. The network could test the UE by allocating resources, which are allowed to have A-MPR. If the UE uses A-MPR this will be directly visible in the Pcmax. In an example embodiment, this test may be performed with regular power headroom (PH) included in the power headroom report if the path loss does not change between different reports. The regular PH may be defined as the difference between the current output power and the Pcmax. The difference between the PHs of two UL allocations may be studied. One of the UL allocation is such that it is not allowed to have A-MPR and the other UL allocation is such that it is allowed to have A-MPR. If eNB knows that the pathloss did not change between the transmissions, it is possible to determiner whether A-MPR was used based on the difference.

In an example embodiment, a network can probe a UE that is in connected mode. The network may operate with such parameters that the connecting UE will not violate additional SEM when transmitting on an uplink channel, for example, physical uplink control channel (PUCCH) or physical random access channel (PRACH) in LTE. In an example embodiment, this can be done by using PUCCH over-provisioning. During connection setup, after the UE has a cell radio network temporary identifier (C-RNTI), the probing may be possible. In an example embodiment, the probing would only need to be done once. As long as the network holds the UE context it could be transferred between eNBs during handovers.

In an example embodiment, when a UE is connecting to the network, the UE capabilities are requested if they are not known. The uplink channel for reporting the UE capabilities may be a physical uplink share channel (PUSCH). If it is not certain that the UE supports the new A-MPR tables, the eNB scheduler would have to allocate "safe" resources for these PUSCH transmissions, and probing would be done as soon as possible. The probing could be, for example, two consequent requests for power headroom reports with two different UL allocations. In an example embodiment, the different resource allocations may be pre-defined resources, with good possibility to get the desired information.

The probing is possible with either power headroom or Pcmax carried in a power headroom report. In an example embodiment, a Pcmax may be indicated directly in a power headroom report. As defined in 36.101 section 6.2.5, Pcmax can be between a lower bound and a higher bound. For one of the UL allocation, the lower bound may not include the A-MPR, while for the other UL allocation, the lower bound may include the A-MPR. Hence, from the difference between Pcmax of at least two UL allocations, it can be determined whether the UE supports A-MPR.

In an example embodiment, power headroom report indicates the difference between current output power and the Pcmax. Assuming that the UE knows and uses the A-MPR table and two different UL allocations are used for power headroom reports, if the path loss and the output power remain the same, power headroom reports will indicate different amount of headroom. In these calculations the difference in allocation size may need to be taken into account, which is known by the eNB and the UE.

Because the use of A-MPR is voluntary, in an example embodiment, one probing possibility is to use a test allocation that the UE for sure cannot meet SEM requirement without A-MPR. This will violate the PS protection limit for one time-to-transmit interval (e.g. 1 ms) in case the legacy UE software hasn't been updated, but the probing result is then certain for later cases. Another possibility is to standardize a test allocation, for which A-MPR would be mandatory, but not necessary to meet the SEM requirement.

In an example embodiment, the new A-MPR tables may have some margin, in order for UE to meet the SEM with sufficient margin, regardless where the allocation is.

In an example embodiment, the A-MPR tables may be versioned, and corresponding signaling is specified to allow the UE to indicate to the network which version of the tables it supports. In this case, the eNB may not need probing to determine whether the UE supports the A-MPR. The eNB scheduler may be able to treat the UEs in the same band differently depending on the versions of A-MPR tables that the UEs support individually so that a better scheduling decision can be obtained.

Figure 3:
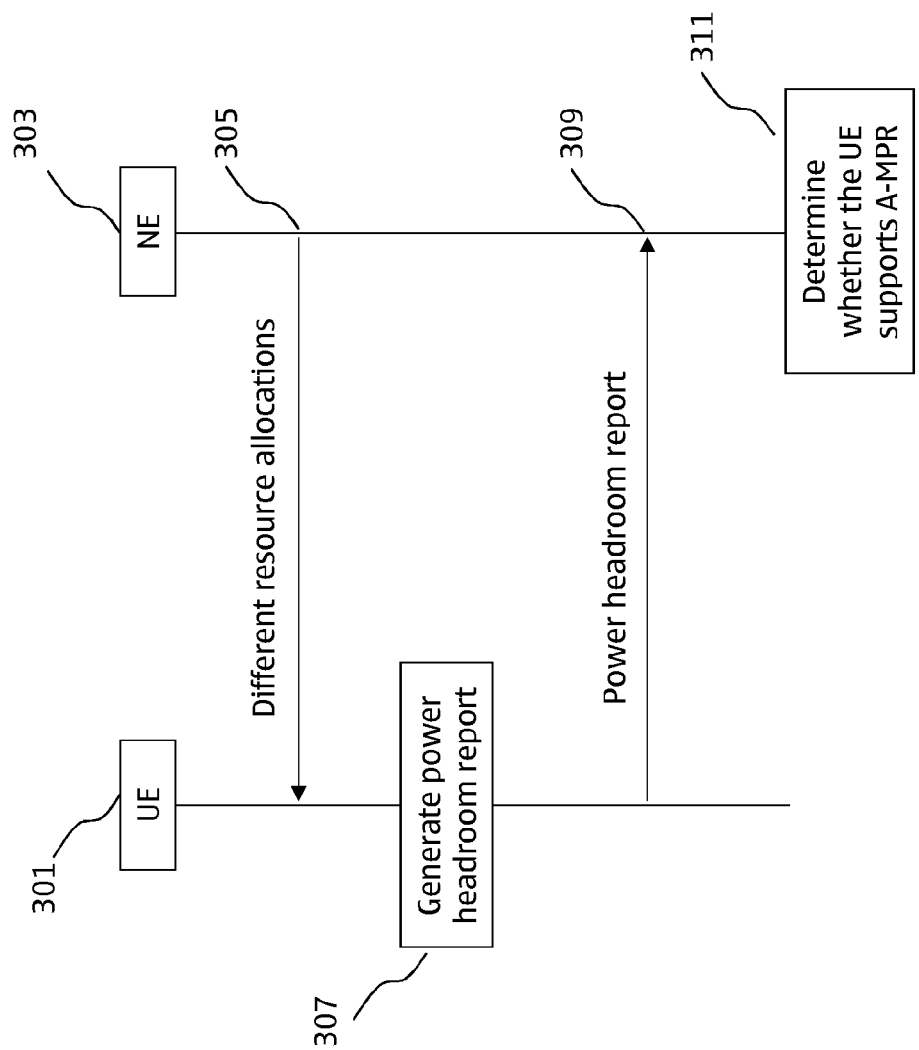
FIG. 3 illustrates an example flow diagram for probing of a user equipment to determine its support of additional maximum power reduction (A-MPR) in accordance with an example embodiment of the application.

FIG. 3 illustrates an example flow diagram for probing of a UE to determine its support of A-MPR in accordance with an example embodiment of the application. In FIG. 3, at 305, a network element (NE) 303, such as for example the eNB 101, 103 or 105 of FIG. 1, sends different resource allocations to a UE 301, such as for example the UE 102, 104 or 106 of FIG. 1. At 307, the UE 301 generates one or more power headroom reports based on the received resource allocations and send to the NE 301 at 309. In an example embodiment, the power headroom report may include a Pcmax. In another example embodiment, the power headroom report may include a regular power headroom that indicates the difference between the current output power and the Pcmax. At 311, the NE 303 determines whether the UE 301 supports the A-MPR based on the received power headroom reports. Note that the FIG. 3 should not be limiting in any respect. For example, although a single step 305 is shown, the different resource allocations may be transmitted in the same time or in different time.

Figure 4:
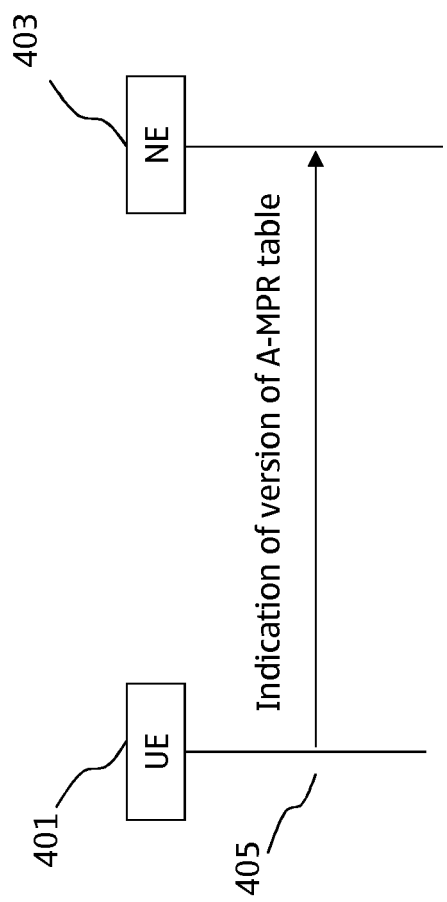
FIG. 4 illustrates an example signaling chart for indicating the version of an A-MPR table in accordance with an example embodiment of the application.

FIG. 4 illustrates an example signaling chart for indicating the version of A-MPR table in accordance with an example embodiment of the application. In FIG. 4, a UE 401, such as for example the UE 102, 104 or 106 of FIG. 1, sends an indication at 405 to a network element 403, such as for example the eNB 101, 103 or 105 of FIG. 1, indicating the version of an A-MPR table that the UE supports. In an example embodiment, the version of the A-MPR table is predefined by the standard and provisioned in the UE. In another example embodiment, the UE may support multiple versions of A-MPR tables and the NE may send an instruction to the UE to indicate which version should be used.

Figure 5:
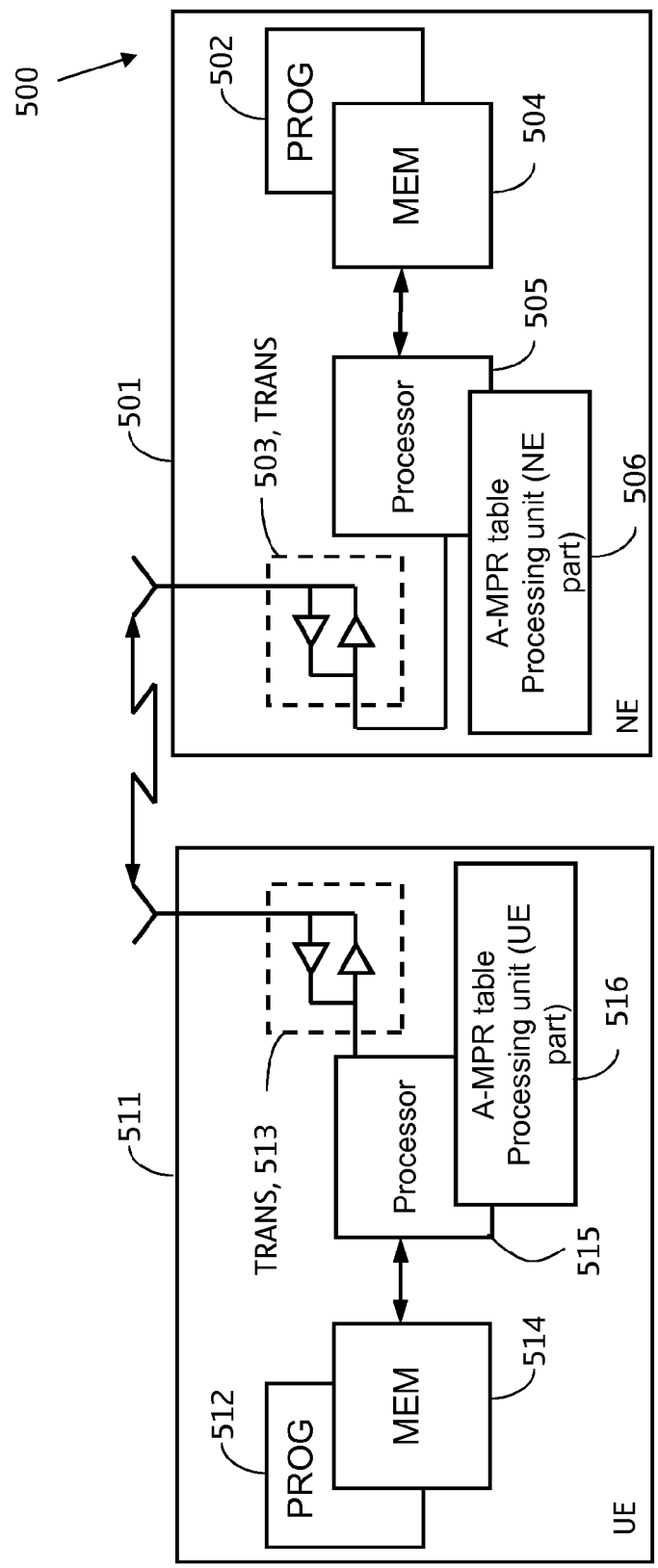
FIG. 5 illustrate a simplified block diagram of various example apparatuses that are suitable for use in practicing various example embodiments of this application.

Reference is made to FIG. 5 for illustrating a simplified block diagram of various example apparatuses that are suitable for use in practicing various example embodiments of this application. In FIG. 5, a wireless network 500 is adapted for communication with a UE 511 via a network element 501. The UE 511 includes a processor 515, a memory (MEM) 514 coupled to the processor 515, and a suitable transceiver (TRANS) 513 (having a transmitter (TX) and a receiver (RX)) coupled to the processor 515. The MEM 514 stores a program (PROG) 512. The TRANS 513 is for bidirectional wireless communications with the NE 501.

The NE 501 includes a processor 505, a memory (MEM) 504 coupled to the processor 505, and a suitable transceiver (TRANS) 503 (having a transmitter (TX) and a receiver (RX)) coupled to the processor 505. The MEM 504 stores a program (PROG) 502. The TRANS 503 is for bidirectional wireless communications with the UE 511. The NE 501 is coupled to one or more external networks or systems, which is not shown in this figure.

As shown in FIG. 5, the NE 501 may further include an A-MPR table processing unit (NE part) 506, for allocating resources to the UE 511 for testing of A-MPR support, determining whether the UE 511 supports the A-MPR, and determining the version of A-MPR table. The unit 506, together with the processor 505 and the PROG 502, may be utilized by the NE 501 in conjunction with various example embodiments of the application, as described herein.

As shown in FIG. 5, the UE 511 may further include an A-MPR table processing unit (UE part) 516, for receiving the resources allocated for testing of A-MPR support, generating and transmitting a power headroom report based on the allocated resources, and sending an indication of version of A-MPR table. The unit 516, together with the processor 515 and the PROG 512, may be utilized by the UE 511 in conjunction with various example embodiments of the application, as described herein.

At least one of the PROGs 502 and 512 is assumed to include program instructions that, when executed by the associated processor, enable the electronic apparatus to operate in accordance with the example embodiments of this disclosure, as discussed herein.

In general, the various example embodiments of the apparatus 511 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The example embodiments of this disclosure may be implemented by computer software or computer program code executable by one or more of the processors 505, 515 of the NE 501 and the UE 511, or by hardware, or by a combination of software and hardware.

The MEMs 504 and 514 may be of any type suitable to the local technical environment and may be implemented using any suitable data storage technology, such as semiconductor-based memory devices, flash memory, magnetic memory devices and systems, optical memory devices and systems, fixed memory and removable memory, as non-limiting examples. The processors 505 and 515 may be of any type suitable to the local technical environment, and may include one or more of general purpose computers, special purpose computers, microprocessors, digital signal processors (DSPs) and processors based on multi-core processor architecture, as non-limiting examples.

Without in any way limiting the scope, interpretation, or application of the claims appearing below, a technical effect of one or more of the example embodiments disclosed herein may be allowing a legacy UE to roam into a new network that has strict requirement for emission, optimizing the eNB scheduler, and easing future development of the standard.

Embodiments of the present invention may be implemented in software, hardware, application logic or a combination of software, hardware and application logic. The software, application logic and/or hardware may reside on an apparatus such as a user equipment, a Node B or other mobile communication devices. If desired, part of the software, application logic and/or hardware may reside on an eNode B/base station 501, part of the software, application logic and/or hardware may reside on a user equipment 511, and part of the software, application logic and/or hardware may reside on other chipset or integrated circuit. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device. A computer-readable medium may comprise a computer-readable storage medium that may be any media or means that can contain or store the instructions for use by or in connection with an instruction execution system, apparatus, or device.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

For example, while the example embodiments have been described above in the context of the LTE system, it should be appreciated that the example embodiments of this invention are not limited for use with only this one particular type of wireless communication system, and that they may be used to advantage in other wireless communication systems.

Further, the various names used for the described parameters are not intended to be limiting in any respect, as these parameters may be identified by any suitable names. Further, the various names assigned to different channels (e.g., PUCCH, etc.) are not intended to be limiting in any respect, as these various channels may be identified by any suitable names.

If desired, the different functions discussed herein may be performed in a different order and/or concurrently with each other. Furthermore, if desired, one or more of the above-described functions may be optional or may be combined. As such, the foregoing description should be considered as merely illustrative of the principles, teachings and example embodiments of this invention, and not in limitation thereof.

What is claimed is:

1. A method, comprising:
receiving, by a processor, an indication of a version of a plurality of versions of an additional maximum power reduction table that is supported by a user equipment, wherein the indication is transmitted from the user equipment.

2. The method according to claim 1, wherein the version of the additional maximum power reduction table is predefined by a standard and provisioned in the user equipment.

3. The method according to claim 1, wherein multiple versions of additional maximum power reduction tables are supported by the user equipment.

4. An apparatus, comprising:
at least one processor;
and at least one memory including computer program code,
wherein the at least one memory and the computer program code configured to, with the at least one processor, cause the apparatus at least to:
receive an indication of a version of a plurality of versions of an additional maximum power reduction table that is supported by a user equipment, wherein the indication is transmitted from the user equipment.

5. The apparatus according to claim 4, wherein the version of the additional maximum power reduction table is predefined by a standard and provisioned in the user equipment.

6. The apparatus according to claim 4, wherein multiple versions of additional maximum power reduction tables are supported by the user equipment.

7. A computer program product comprising a non-transitory computer-readable medium bearing computer program code embodied therein for use with a computer, the computer program code comprising:
code for receiving an indication of a version of a plurality of versions of an additional maximum power reduction table that is supported by a user equipment, wherein the indication is transmitted from the user equipment.

8. The computer program product according to claim 7, wherein the version of the additional maximum power reduction table is predefined by a standard and provisioned in the user equipment.

9. The computer program product according to claim 7, wherein multiple versions of additional maximum power reduction tables are supported by the user equipment.

10. A method, comprising:
providing, by a processor, to a network element an indication of a version of a plurality of versions of an additional maximum power reduction table that is supported by a user equipment, wherein the indication is transmitted from the user equipment.

11. The method according to claim 10, wherein the version of the additional maximum power reduction table is predefined by a standard and provisioned in the user equipment.

12. The method according to claim 10, wherein multiple versions of additional maximum power reduction tables are supported by the user equipment.

13. An apparatus, comprising:
at least one processor;
and at least one memory including computer program code,
wherein the at least one memory and the computer program code configured to, with the at least one processor, cause the apparatus at least to:
provide to a network element an indication of a version of a plurality of versions of an additional maximum power reduction table that is supported by a user equipment, wherein the indication is transmitted from the user equipment.

14. The apparatus according to claim 13, wherein the version of the additional maximum power reduction table is predefined by a standard and provisioned in the user equipment.

15. The apparatus according to claim 13, wherein multiple versions of additional maximum power reduction tables are supported by the user equipment.

16. A computer program product comprising a non-transitory computer-readable medium bearing computer program code embodied therein for use with a computer, the computer program code comprising:
code for providing to a network element an indication of a version of a plurality of versions of an additional maximum power reduction table that is supported by a user equipment, wherein the indication is transmitted from the user equipment.

17. The computer program product according to claim 16, wherein the version of the additional maximum power reduction table is predefined by a standard and provisioned in the user equipment.

18. The computer program product according to claim 16, wherein multiple versions of additional maximum power reduction tables are supported by the user equipment.

* * * * *